United States Patent [19]

Matsumura et al.

[11] Patent Number: 4,845,600
[45] Date of Patent: Jul. 4, 1989

[54] VEHICLE SPOILER LAMP DEVICE

[75] Inventors: Naoki Matsumura; Toshiyasu Mochizuki, both of Shizuoka, Japan

[73] Assignee: Koito Manufacturing Co., Ltd., Tokyo, Japan

[21] Appl. No.: 230,949

[22] Filed: Aug. 11, 1988

[30] Foreign Application Priority Data

Mar. 14, 1988 [JP] Japan .................. 63-58172

[51] Int. Cl.⁴ .................... F21V 29/00; B60Q 1/44
[52] U.S. Cl. ........................... 362/80; 362/294; 362/373; 340/479
[58] Field of Search ............ 439/445, 452, 548, 559; 362/80, 373, 218, 294; 340/87, 66

[56] References Cited

U.S. PATENT DOCUMENTS

| | | | |
|---|---|---|---|
| 2,073,159 | 3/1937 | Lintern et al. | 340/87 |
| 3,518,619 | 6/1970 | De Lano | 439/548 |
| 3,868,502 | 2/1975 | Beeren et al. | 362/373 |
| 4,131,329 | 12/1978 | Flatt | 439/445 |
| 4,724,515 | 2/1988 | Matsuki et al. | 362/80 |
| 4,733,335 | 3/1988 | Serizawa | 362/80 |
| 4,736,279 | 4/1988 | Yamai et al. | 362/80 |
| 4,744,011 | 5/1988 | Tomita et al. | 362/80 |
| 4,771,369 | 9/1988 | Hymer | 362/80 |

FOREIGN PATENT DOCUMENTS

| | | | |
|---|---|---|---|
| 0199746 | 10/1985 | Japan | 340/87 |
| 0160328 | 7/1986 | Japan | 362/80 |
| 0160329 | 7/1986 | Japan | 362/80 |
| 0160330 | 7/1986 | Japan | 362/80 |
| 0160331 | 7/1986 | Japan | 362/80 |

Primary Examiner—Ira S. Lazarus
Assistant Examiner—David G. Messer
Attorney, Agent, or Firm—Sughrue, Mion, Zinn, Macpeak & Seas

[57] ABSTRACT

A vehicle lamp device in which the inside of a lamp unit is communicated with the outside while maintaining a water-proof property of the lamp unit itself so that generation of water droplets is prevented. The lamp unit constituted by a lamp body for housing a large number of light-emitting diodes arranged at predetermined intervals in a transverse direction of a vehicle body and a front face lens covering a front opening portion of the lamp body incorporated in a spoiler disposed on an upper surface of a rear end portion of a roof of the vehicle body so that the front face lens is exposed to the outside through an opening portion formed in a rear end surface of the spoiler. A rubber bushing is disposed in the spoiler, and lead wires of the lamp unit are led out to the outside of the lamp unit through a lead-out portion which projects from a back surface of the lamp body and are inserted through lead-wire insertion holes formed in the rubber bushing. A tube is integrally provided with the rubber bushing with a free end of the tube being connected to the lead-out portion. Air holes are formed through the rubber bushing having ends communicating with the tube.

10 Claims, 4 Drawing Sheets

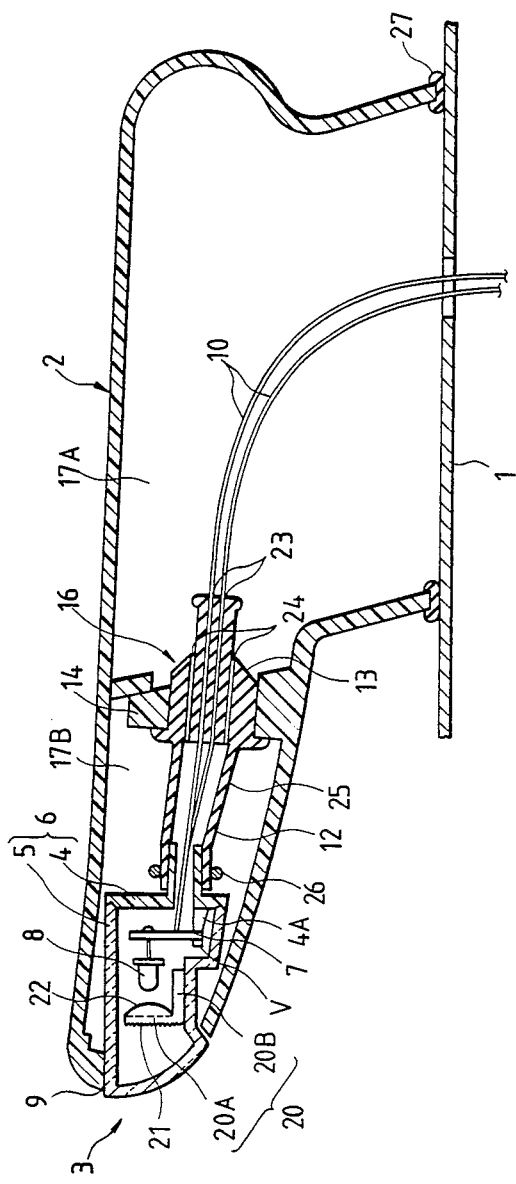
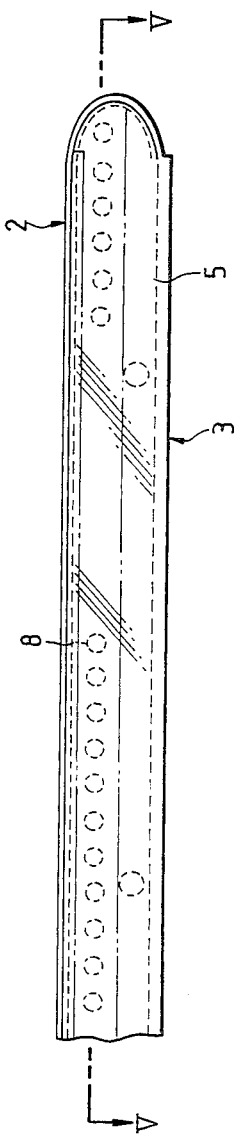
FIG. 3
FIG. 4

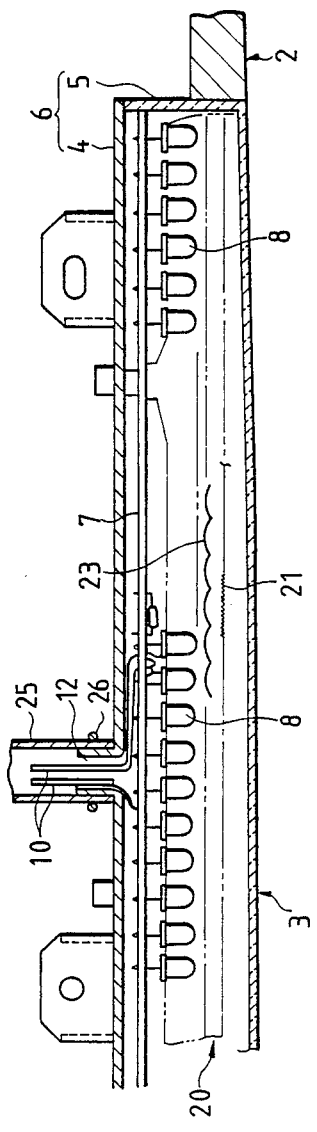
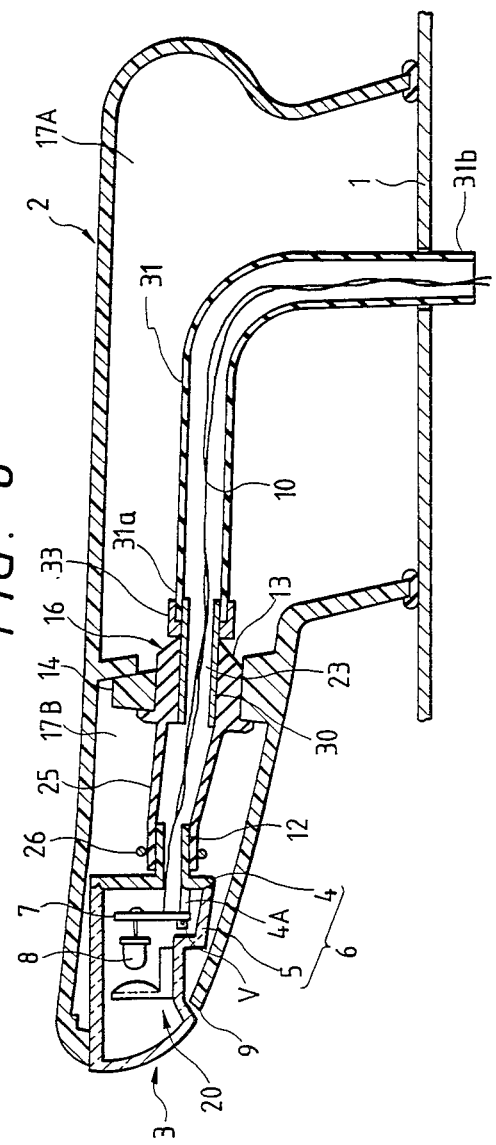

VEHICLE SPOILER LAMP DEVICE

BACKGROUND OF THE INVENTION

The present invention relates to a vehicle lamp device in the form of a high-mount stop lamp or the like mounted on an upper surface of a rear end portion or on a roof of a vehicle body for warning following vehicles.

A high-mount stop lamp is a lamp device employed for the purpose of warning following vehicles upon braking so as to enhance road safety. Such a high-mount stop lamp is designed to be brightly lit together with a brake light during braking so as to make drivers of following vehicles pay greater attention to thereby prevent a rear-end collision or the like from occurring.

Recently, such a high-mount stop lamp has been incorporated in a spoiler 2 disposed on upper surface of a rear end portion of a vehicle body 1 as shown in FIGS. 1 and 2. As shown in those figures, reference numeral 3 designates a high-mount stop lamp constituted by a lamp unit 6 having a lamp body 4 and a front face lens 5, a printed substrate 7 fixed to an attachment portion 4A of the lamp body 4 by a bolt V, and a large number of light-emitting diodes (LEDs) 8 disposed on a surface of the printed substrate 7 arranged parallel to one another at predetermined intervals in the transverse direction of the vehicle body 1. The lamp 3 is incorporated in the spoiler 2 with the front face lens 5 covering an opening portion 9 formed in a rear end surface of the spoiler 2. Reference numeral 12 designates a cylindrically shaped lead-wire lead-out portion integrally formed on a back surface of the lamp body 4, and reference numeral 13 designates an insertion hole formed in a partition wall 14 dividing the inside of the spoiler 2 into two (front and rear) chambers 17A and 17B. Rubber bushings 15 and 16 are fitted in the wire lead-out portion 12 and the insertion hole 13 respectively. Lead wires 10 of the high-mount stop lamp 3 are inserted into the lamp unit 6 through wire insertion holes formed in the rubber bushings 15 and 16 and are connected to an electric circuit on the printed substrate 7.

In such a high-mount stop lamp 3 in which LEDs 8 are generally used as light sources, however, there has been a problem in that, since the lamp body 4 and front face lens 5 are arranged to constitute a completely enclosed type lamp unit 6, when moisture in the air sealed inside the lamp unit 6 in the assembly of the lamp condenses on the inner surface of the front face lens 5 in the form of water droplets as the ambient temperature drops, the quantity of light from the LEDs 8 transmitted through the front face lens 5 is decreased to thereby reduce the lighting efficiency.

Japanese Laid-Open Patent Publications Nos. 61-160328, 61-160329, 61-160330, and 61-160331 teach various lighting arrangements in spoilers. None of these, however, disclose a solution to the moisture accumulation problem.

Co-asigned U.S. Pat. Nos. 4,733,335 and 4,744,011 disclose vehicle lamps provided with air passageways to relieve moisture buildup. However, the structures of those lamps are not suitable for a spoiler-mounted lamp unit.

SUMMARY OF THE INVENTION

It is therefore an object of the present invention to solve the foregoing problem in the prior art and to provide a vehicle lamp device for use with a spoiler in which the inside of a lamp unit is communicated with the outside while maintaining a waterproof property of the lamp unit itself so that generation of water droplets can be prevented.

In order to attain the above and other objects, according to the present invention, a vehicle lamp device is provided including a lamp unit constituted by a lamp body for housing a large number of light-emitting diodes arranged at predetermined intervals in a transverse direction of a vehicle body and a front face lens covering a front opening portion of the lamp body incorporated in a spoiler disposed on an upper surface of a rear end portion of the trunk or roof of the vehicle body so that the front face lens is exposed to the outside through an opening portion formed in a rear end surface of the spoiler. A rubber bushing is disposed in the spoiler, and lead wires of the lamp unit are led out to the outside of the lamp unit through a lead-out portion which projects from a back surface of the lamp body and are inserted through lead-wire insertion holes formed in the rubber bushing. A tube is integrally provided with the rubber bushing, with a free end of the tube being connected to the lead-out portion. Air holes are formed through the rubber bushing having ends communicating with the tube.

According to the present invention, the inside of the lamp unit is communicated with the outside through the air holes formed in the rubber bushing. Thus, air is allowed to circulate to thereby make the temperature and humidity inside the lamp unit substantially equal to those of the outside. As a result, generation of water droplets is reduced or prevented. Further, because the lamp unit is of the open type, the rise of the temperature and pressure of the lamp unit when the LEDs are in the on-state is not large. The rubber bushing has the tube integrally formed therewith to thereby make the lamp unit waterproof.

BRIEF DESCRIPTION OF THE DRAWINGS

The present invention will be described in detail with respect to preferred embodiments illustrated in the drawings, of which:

FIG. 3 is a sectional view showing a preferred embodiment of a lamp unit of the invention applied to a high-mount stop lamp;

FIG. 4 is a front view showing a main part of the embodiment of FIG. 3;

FIG. 5 is a cross-sectional view taken along a line V—V in FIG. 4;

FIG. 6 is a cross-sectional view of another embodiment of a lamp unit constructed in accordance with the invention.

DESCRIPTION OF THE PREFERRED EMBODIMENTS

With reference now to FIGS. 3, 4, and 5, a first preferred embodiment of the present invention will now be described.

Figure 1:
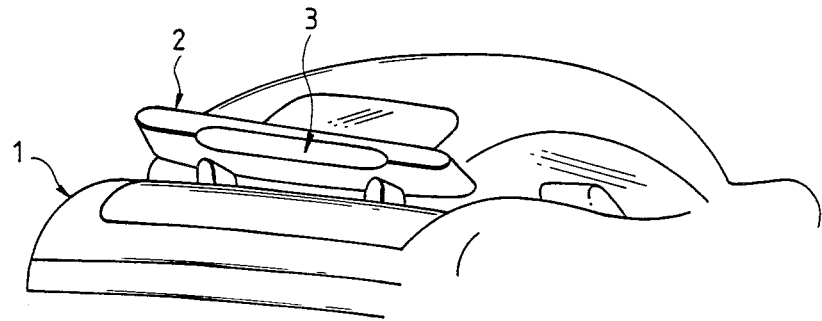
FIG. 1 is a perspective view showing the external appearance of a car provided with a conventional high-mount stop lamp.
Figure 2:
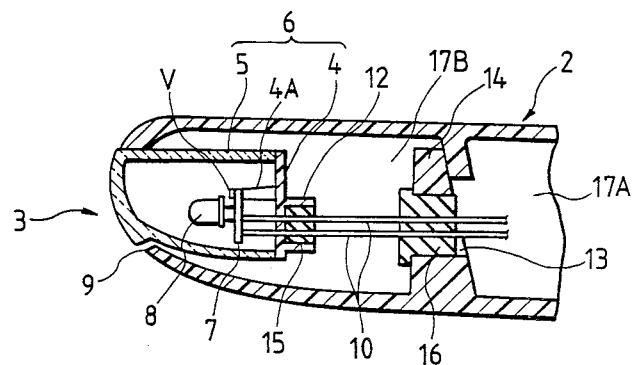
FIG. 2 is a cross-sectional view of the lamp of FIG. 1.

In FIGS. 3, 4, and 5, the same constituent components or parts as those in FIGS. 1 and 2 are referenced correspondingly, and a further detailed explanation of such elements is omitted.

In FIGS. 3, 4, and 5, reference numeral 20 designates an inner lens disposed in a lamp unit 6. The inner lens 20 is substantially L shaped with a vertical portion 20A disposed in front of an in opposition to LEDs 8 with a suitable interval therebetween. The front surface of the vertical portion 20A is subject to a suitable treatment to provide a diffusion surface, and a number of condensers 22 constituted by convex lenses corresponding to the respective LEDs 8 are integrally formed on a rear surface of the vertical portion 20A. A horizontal portion 20B of the inner lens 20 is fixed to an internal lower surface of a front face lens 5 by ultrasonic welding. Further, the front face lens 5 is fixed to a lamp body 4 by ultrasonic welding.

Lead-wire insertion holes 23 through which lead wires 10 of a high-mount stop lamp 3 pass and air holes 24 are formed in a rubber bushing 16 which is fixedly fitted in an insertion hole 13 formed through a partition wall 14, so that the holes 23 and 24 are opened in front and rear surfaces of the bushing 16. Further, a tube 25 is integrally provided on a front surface, that is, a surface opposite to the lamp unit 6, of the rubber bushing 16, and a top end portion of the tube 25 is fitted onto an outer peripheral surface of a lead-wire origination portion 12 of the lamp body 4 and fixed thereto by a clip 26. The lead-wire insertion holes 23 and the air holes 24 are communicated with the inside of the tube 25. The inside of the lamp unit 6 is therefore communicated with an internal chamber 17A of a spoiler 2 at the front side of the vehicle body through the tube 25 and the air holes 24.

The arrangement of other portions is the same as in the conventional lamp unit described above.

In the thus-arranged high-mount stop lamp 3, it is not necessary to consider moisture in the air during assembly because the lamp unit 6 is opened to the atmosphere through the air holes 24, and water droplets are not generated when the temperature drops because the temperature and humidity of the inside of the lamp unit are maintained substantially equal to those of the outside. Therefore, satisfactory lighting effects are maintained at all times. Since the lamp unit 6 is of the open type, the pressure and temperature inside the lamp unit 6 cannot be abnormally raised by heat generation when the LEDs 8 are activated.

Further, rainwater cannot enter the lamp unit 6 through the air holes 24 because the lead-out portion 12 and the air holes 24 are separated from each other by the tube 25 integrally formed with the rubber bushing 16. Thus, a lamp having a waterproof structure is obtained. Further, the number of bushgings can be reduced to thereby make it possible to reduce the number of assembly steps.

FIG. 6 is a cross-sectional view showing another embodiment of the present invention. In this embodiment, a lead-wire insertion hole 23 is formed through a rubber bushing 16 having a sufficiently large size as to be used also as an air hole. Further, a reinforcing tube 30 made of a metal or plastic material is inserted into the lead-wire insertion hole 23 to thereby prevent deformation of the hole 23 from occurring when the rubber bushing 16 is pressed into an insertion hole 13. One end 31a of a protecting tube 31 for protecting the lead wires 10 is connected to one end of the reinforcing tube 30 at the vehicle body front side by an adhesive tape 33, and the other end 31b of the tube 31 extends into the interior of the vehicle body 1. In this arrangement, there is an advantage in that the distance between the lead-out portion 12 and the other end opening portion of the protecting tube 31 can be made large so that the lamp unit 6 is better protected from rainwater to thereby improve the reliability of the unit.

Figure 7:
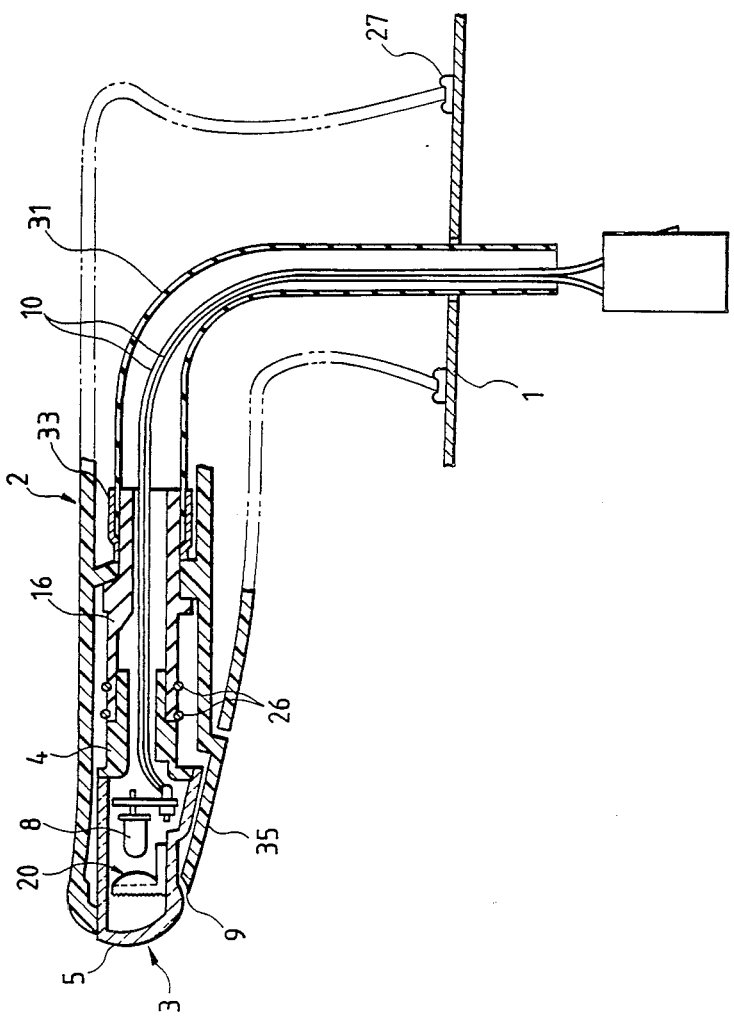
FIG. 7 is a cross-sectional view of yet another embodiment of the invention.

FIG. 7 is a cross-sectional view showing a still further embodiment of the present invention. In this embodiment, a tube 31 is directly fitted onto an outer peripheral surface of a front end portion of a rubber bushing 16 and fixed thereto by an adhesive tape 33. The arrangement of other portions is substantially the same as in the foregoing embodiments. In this embodiment too the same effects as those of the foregoing embodiments can be expected.

As described above, in the vehicle lamp device according to the present invention, the temperature and humidity inside the lamp unit can be made to be substantially equal to those on the outside because the lead-wire lead-out portion of the lamp unit incorporated in the spoiler and the rubber bushing disposed in the spoiler are connected to each other through the tube integrally formed with the bushing and because the air holes are formed in the rubber bushing so that the inside of the lamp unit is communicated with the outside through the tube and the air holes, making the lamp unit of the open type. There is therefore little possibility that a temperature reduction of the outside air will cause moisture in the lamp unit to condense as water droplets adhering to the lens inner surface. Hence, the lighting effects provided by the lamp unit of the invention are improved over the conventional unit. Further, although provided with a lamp unit of the open type, the lamp device has good waterproofing reliability because the lead-wire lead-out portion is sealed by the rubber bushing. Moreover, there is no limitation imposed on the ambient humidity during assembly, and the number of rubber bushings is minimized to thereby make it possible to reduce the number of assembly steps.

What is claimed is:

1. A vehicle lamp device comprising: a spoiler; a lamp unit mounted in said spoiler, said lamp unit comprising a lamp body, a large number of light-emitting diodes mounted in said lamp body and arranged at predetermined intervals in a transverse direction of a vehicle body, and a front face lens covering a front opening portion of said lamp body, said spoiler being disposed on an upper surface of a rear end portion of a roof of said vehicle body so that said front face lens is exposed to the outside through an opening portion formed in a rear end surface of said spoiler; a rubber bushing disposed in said spoiler, said rubber bushing having at least one lead-wire insertion hole and at least one air passage formed therethrough adjacent to said lead-wire insertion hole; a lead-wire lead-out portion for leading lead wires of said lamp unit to the outside of said lamp unit, said lead-out portion being integral with and projecting from a back surface of said lamp body, said lead-out portion being spaced from said rubber bushing, said lead wires passing through said lead-out portion and said at least one lead-wire insertion hole formed through said rubber bushing; a tube integrally formed with said rubber bushing, a free end of said tube being connected to said lead-wire lead-out portion, said at least one air hole formed through said rubber bushing having an end communicated with said tube, whereby atmospheric air is communicated with an interior of said lamp body through said at least one air passage, said tube, and said lead-out portion.

2. The vehicle lamp device of claim 1, wherein one said lead-wire insertion hole is provided through said rubber bushing for each lead wire from said lamp unit.

3. The vehicle lamp device of claim 1, wherein a plurality of said air holes are provided through said rubber bushing.

4. The vehicle lamp device of claim 1, wherein said rubber bushing is fixedly fitted in an insertion hole formed in a partition wall of said spoiler.

5. A vehicle lamp device comprising: a spoiler; a lamp unit mounted in said spoiler, said lamp unit comprising a lamp body, a large number of light-emitting diodes mounted in said lamp body and arranged at predetermined intervals in a transverse direction of a vehicle body, and a front face lens covering a front opening portion of said lamp body, said spoiler being disposed on an upper surface of a rear end portion of a roof of said vehicle body so that said front face lens is exposed to the outside through an opening portion formed in a rear end surface of said spoiler; a rubber bushing disposed in an aperture in a partition wall of said spoiler, a lead-wire lead-out portion for leading lead wires of said lamp unit to the outside of said lamp unit, said lead-out portion projecting from a back surface of said lamp body and being spaced from said rubber bushing, said lead wires passing through a hole formed through said rubber bushing; a tube integrally formed with said rubber bushing, a free end of said tube being connected to said lead-wire lead-out portion; and a projecting tube extending from a forward end of said rubber bushing, communicating at one end with said hole formed through said rubber bushing and at the other with an interior portion of said vehicle body, said lead wires passing from said lead-out portion through a path defined by the interior of said tube integrally formed with said rubber bushing, said hole formed through said rubber bushing, and said protecting tube, said path being sufficiently wide to serve as an air passage between the interior of said lamp unit and the interior portion of said vehicle body.

6. The vehicle lamp device of claim 5, wherein said rubber bushing is fixedly fitted in an insertion hole formed in a partition wall of said spoiler.

7. The vehicle lamp device of claim 5, further comprising a reinforcing tube disposed around said hole formed through said rubber bushing.

8. The vehicle lamp device of claim 5, further comprising adhesive tape for connecting said protecting tube to said rubber bushing.

9. The vehicle lamp device of claim 5, wherein said protecting tube is fitted onto an outer peripheral surface of a front end portion of said rubber bushing.

10. The vehicle lamp device of claim 9, further comprising adhesive tape for fixing said protecting tube to said outer peripheral surface of said front end portion of said rubber housing.

* * * * *